United States Patent [19]

Morishita et al.

[11] Patent Number: 4,984,647
[45] Date of Patent: Jan. 15, 1991

[54] ELECTRIC POWER STEERING APPARATUS

[75] Inventors: Mitsuharu Morishita; Kosaku Uota; Takeshi Yasukawa, all of Himeji City, Japan

[73] Assignee: Mitsubishi Denki Kabushiki Kaisha, Tokyo, Japan

[21] Appl. No.: 532,407

[22] Filed: Jun. 4, 1990

Related U.S. Application Data

[62] Division of Ser. No. 344,579, Apr. 28, 1989, Pat. No. 4,957,182.

[30] Foreign Application Priority Data

Apr. 28, 1988 [JP] Japan ............................... 63-108132

[51] Int. Cl.⁵ ............................................. B62D 5/04
[52] U.S. Cl. ................................ 180/79.1; 364/424.05
[58] Field of Search ....................... 180/79.1, 141, 142; 364/424.01, 424.05

[56] References Cited

U.S. PATENT DOCUMENTS

| | | | |
|---|---|---|---|
| 4,666,011 | 5/1987 | Ohe et al. ........................ | 364/424.05 |
| 4,809,173 | 2/1989 | Fukami et al. ..................... | 180/79.1 |
| 4,819,170 | 4/1989 | Shmizu ............................ | 180/79.1 |
| 4,869,334 | 9/1989 | Marumoto et al. ................. | 180/79.1 |
| 4,893,688 | 1/1990 | Morishita ......................... | 180/79.1 |
| 4,903,208 | 2/1990 | Murai et al. ..................... | 364/424.05 |
| 4,913,249 | 4/1990 | Lang ............................... | 364/424.05 |

Primary Examiner—Richard A. Bertsch
Assistant Examiner—A. M. Boehler
Attorney, Agent, or Firm—Sughrue, Mion, Zinn, Macpeak and Seas

[57] ABSTRACT

An electric power steering apparatus for an automotive vehicle has an interrupter which cuts off the power to a drive motor when a dangerous situation is detected. In one form of the invention, the interrupter cuts off power to the drive motor when a ground fault sensor detects a ground fault of a motor driver and there is disagreement between a directional drive signal to the drive motor and the direction of torque applied to the steering wheel by the driver. In another form of the invention, the interrupter circuit cuts off power when the vehicle speed exceeds a prescribed level and the torque applied to the steering wheel exceeds a prescribed level for a certain length of time. In a third form of the invention, the interrupter cuts off power when the motor current exceeds a prescribed level and disagreement of directional signals is detected.

3 Claims, 7 Drawing Sheets

ELECTRIC POWER STEERING APPARATUS

This is a division of application Ser. No. 07/344,579, filed Apr. 28, 1989, now U.S. Pat. No. 4,957,182, issued Sept. 18, 1990.

BACKGROUND OF THE INVENTION

This invention relates to an electric power steering apparatus for an automobile which employs an electric motor to decrease the steering torque which must be exerted by a driver in order to steer the automobile. More particularly, it relates to an electric power steering apparatus which can guarantee safe operation.

Electric power steering apparatuses for automobiles are well known. In these apparatuses, an electric motor is connected to a steering shaft of an automobile by a clutch. The application of torque to the steering wheel by the driver of the automobile is detected by a torque sensor, which produces a corresponding output signal. Based on the output signal, a CPU controls the electric motor through a motor driver so as to rotate the steering shaft in a direction which will decrease the torque which need be applied by the driver in order to steer the automobile.

Conventional electric power steering apparatuses have a number of problems with respect to safety. For example, when there is a ground fault in a portion of the motor driver for the electric motor, it is possible for the electric motor to be driven, even though the driver is not applying any torque to the steering wheel. This produces the extremely dangerous situation of the automobile being steered in a manner contrary to the will of the driver.

Sometimes, due to a problem with the power steering apparatus, a directional command signal which is input to the motor driver does not agree with the direction of torque which is applied to the steering wheel by the driver of the automobile. If the motor driver is operating normally, no power will be supplied to the motor in this situation, but if there is a ground fault in the motor driver, current may end up being supplied to the motor, and the wheels of the vehicle may be steered in the direction opposite to the direction desired by the driver, which is of course highly dangerous.

Another problem is that the electric motor can exert a torque on the steering shaft even in situations in which power steering is unsafe, such as when the vehicle is traveling at a high speed and the driver applies a large torque to the steering wheel.

SUMMARY OF THE INVENTION

Accordingly, it is an object of the present invention to provide an electric power steering apparatus for an automotive vehicle which can operate safely even when a ground fault of a motor driver occurs.

It is another object of the present invention to provide an electric power steering apparatus which can operate safely at high vehicle speeds.

In accordance with the present invention, these objects are attained by the provision of an interrupting circuit which can cut off the supply of electrical power to a motor driver when a dangerous situation is detected, thereby restoring the steering wheel to manual operation.

In one form of the present invention, the interrupting circuit is responsive to a ground fault sensor which senses ground faults of a motor driver and disagreement sensing means for sensing when the directional drive signals being input to a motor disagree with the direction of torque applied to the steering wheel by the driver. When there is a ground fault of the motor driver and directional disagreement is sensed, the interrupting circuit automatically prevents the motor from applying torque to the steering shaft.

In another form of the present invention, the interrupting circuit is responsive to a speed level sensor and a torque level sensor. If the vehicle speed is above a prescribed level and a prescribed torque level is maintained for a prescribed length of time, the interrupting circuit automatically prevents the motor from applying torque to the steering shaft.

In yet another form of the present invention, the interrupting circuit is responsive to a current sensor which senses the current flowing through the drive motor and disagreement sensing means for sensing when the directional drive signals being input to a motor disagree with the direction of torque applied to the steering wheel by the driver. When the motor current exceeds a prescribed level and directional disagreement is sensed, the interrupting circuit automatically prevents the motor from applying torque to the steering shaft.

BRIEF DESCRIPTION OF THE DRAWINGS

In the drawings, the same reference numerals indicate the same or corresponding parts.

DESCRIPTION OF THE PREFERRED EMBODIMENTS

Figure 1:
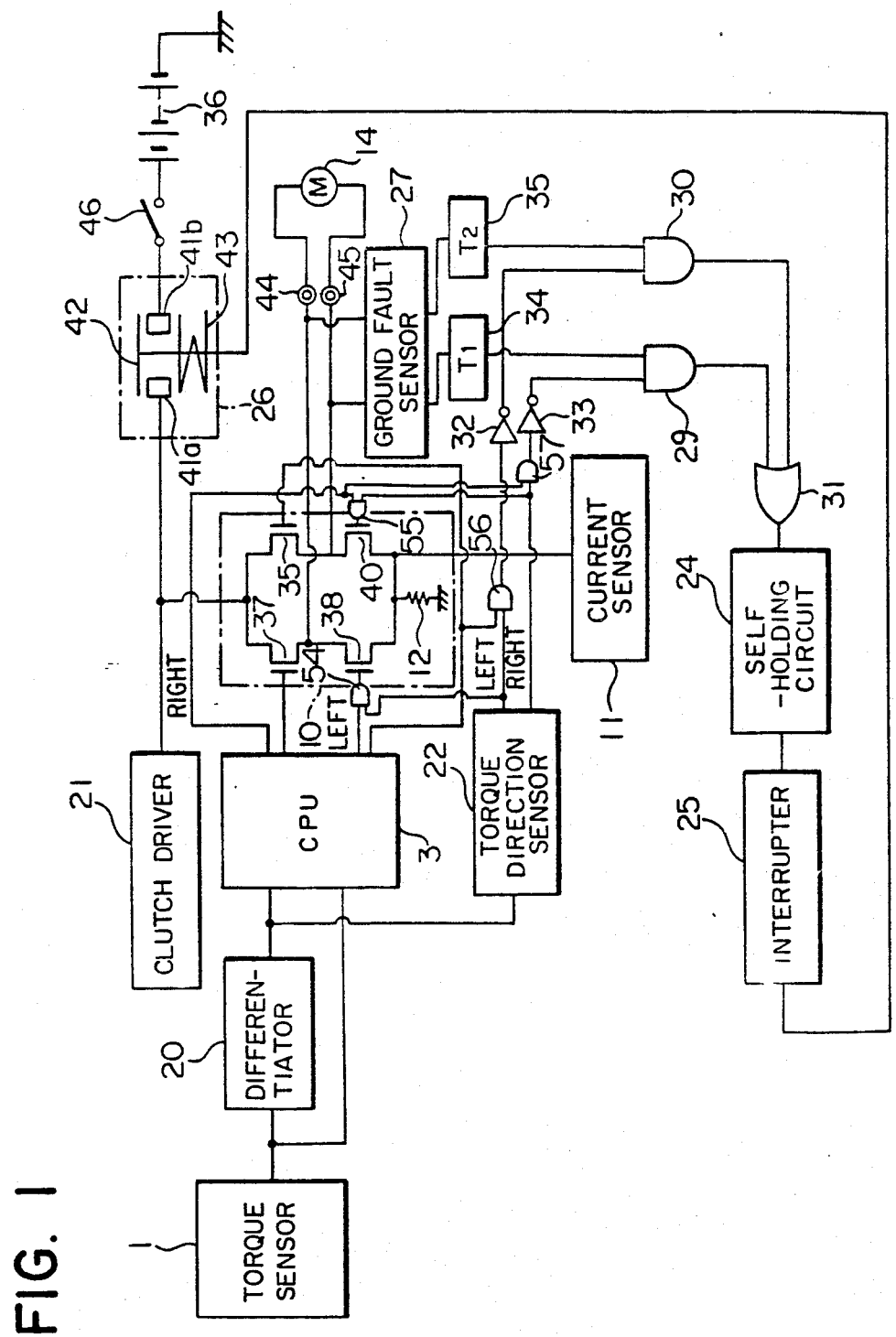
FIG. 1 is a block diagram of a first embodiment of an electric power steering apparatus according to the present invention.
Figure 7:
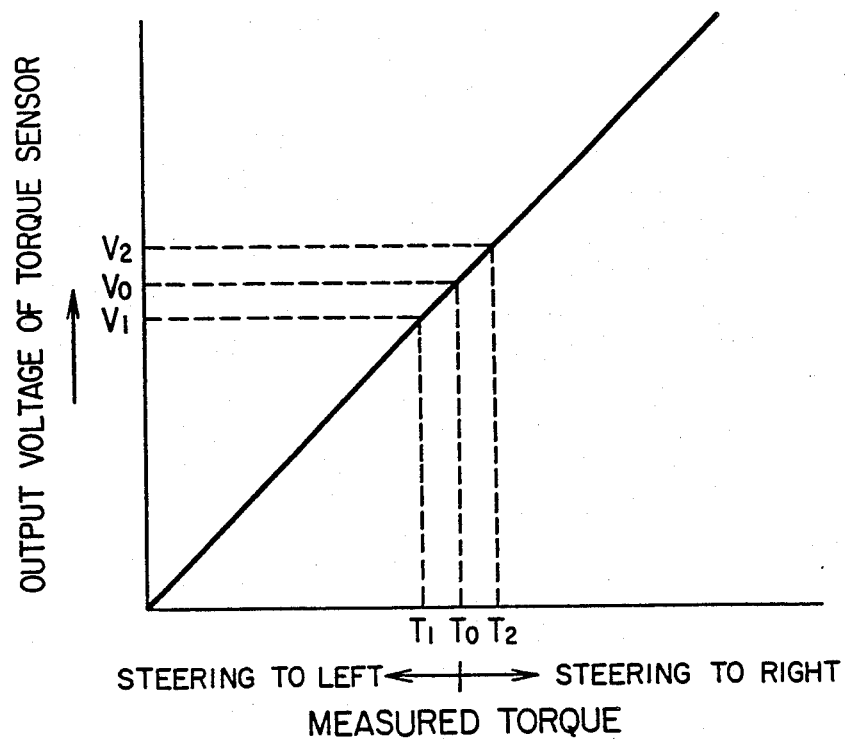
FIG. 7 is a graph of the output of the torque sensor 1 of FIG. 1 as a function of the torque applied to a steering wheel.

Hereinbelow, a number of preferred embodiments of an electric power steering apparatus in accordance with the present invention will be described while referring to the accompanying drawings. FIG. 1 is a block diagram which conceptually illustrates the structure of a first embodiment. As shown in FIG. 1, a torque sensor 1 is provided which detects the magnitude and direction of the torque which is applied to an unillustrated steering wheel by a driver and generates a corresponding output signal. FIG. 7 illustrates an example of the output voltage of the torque sensor 1 as a function of the torque applied to the steering wheel, which will be referred to as the steering torque. Point $T_0$ on the horizontal axis indicates a neutral point at which no torque is applied to the steering wheel. A value to the right of this point on the horizontal axis indicates steering torque for a right turn and a value to the left of this point indicates steering torque for a left turn. T1 and T2 are threshold torques for steering to the left and right, respectively, and define a dead band of control. When the steering torque is between T1 and T2, power steering does not take place.

When the steering torque is $T_0$, $T_1$, or $T_2$, the torque sensor 1 produces an output voltage V0, V1, or V2, respectively. Within the range of control, the output voltage of the torque sensor 1 is nearly linear with respect to the detected steering torque.

The output signal of the torque sensor 1 is input to a differentiator 20 and to a CPU 3. The differentiator 20 differentiates the output signal from the torque sensor 1 with respect to time and provides the differentiated signal to the CPU 3. The differentiated signal is also input to a torque direction sensor 22 which determines the direction of the steering torque being applied to the steering wheel.

The CPU 3 generates two directional signals in the form of a leftward drive signal and a rightward drive signal which are input to a motor driver 10 which comprises four power MOSFET's 37-40 connected together so as to form a bridge. The upper two MOSFET's 35 and 37 are connected to a battery 36 through a failure relay 26 and a key switch 46, while the lower two MOSFET's 38 and 40 are connected to ground through a current detection resistor 12.

The motor driver 10 has two output terminals 44 and 45 which are connected to the terminals of an electric motor 14. The motor 14 can be connected and disconnected from the steering shaft by an unillustrated electromagnetic clutch which is operated by a clutch driver 21. The clutch driver 21 is powered by the battery 36 via the failure relay 26 and the key switch 46.

Figure 8:
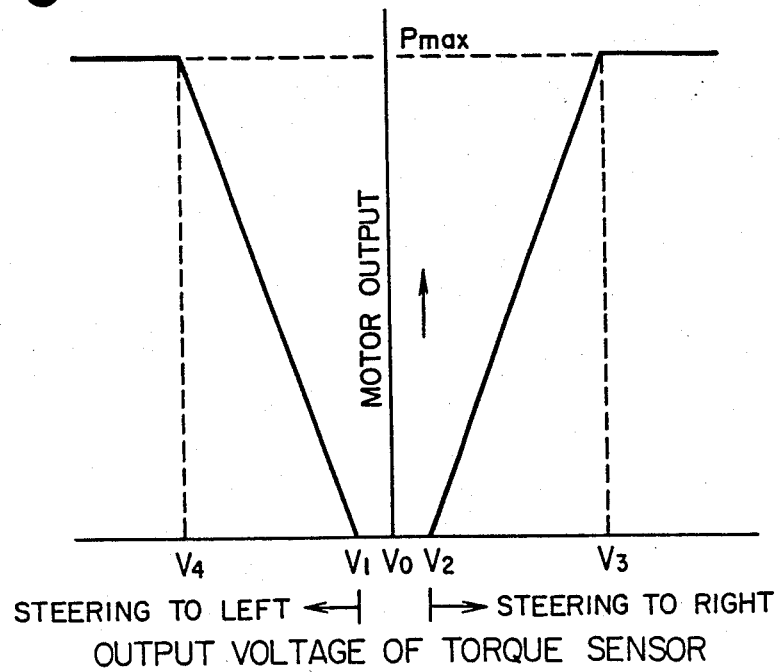
FIG. 8 is a graph of the output of the electric motor as a function of the output of the torque sensor 1.

The motor 14 is controlled by the CPU 3 via the motor driver 10 in accordance with the output signal of the torque sensor 1. FIG. 8 illustrates one example of the output characteristics of the motor 14. The horizontal axis shows the torque signal from the torque sensor 1 and the vertical axis shows the output of the motor 14.

When the output voltage of the torque sensor 1 is between V1 and V2, the motor 14 does not operate; this is the dead band referred to earlier. When the output voltage of the torque sensor 1 is between V2 and a higher voltage V3, the motor 14 exerts a rightward torque on the steering shaft, the torque increasing linearly with the output voltage until it reaches a maximum value Pmax. Similarly, when the output voltage of the torque sensor 1 is between V1 and a lower voltage V4, the motor 14 exerts a leftward torque on the steering shaft, the torque increasing linearly as the output voltage decreases until the motor output reaches the maximum Pmax. For an output voltage of greater than V3 or less than V4, the motor output remains constant at Pmax.

All of the current which flows through the motor 14 also flows through the current detection resistor 12, and the current is determined by a motor current sensor 11 which is connected to the positive end of the current detection resistor 12 and measures the voltage across the resistor 12.

The motor terminals 44 and 45 are also connected to the input terminals of a ground fault sensor 27 which produces a high output signal at one of its output terminals when it detects a ground fault of the motor driver 10. The output signals of the ground fault sensor 27 are applied to the first input terminals of two AND gates 29 and 30 via timers T1 and T2.

Based on the output of the differentiator 20, the torque direction sensor 22 generates two directional signals in the form of a rightward torque signal and a leftward torque signal, indicating the direction of the steering torque which is being applied to the steering wheel by the driver. The leftward torque signal from the torque direction sensor 22 and the leftward drive signal from the CPU 3 are applied to the input terminals of two AND gates 54 and 56. The output terminal of AND gate 54 is connected to the gate of MOSFET 38, and the output terminal of AND gate 56 is connected to the second input terminal of AND gate 30 via an inverter 32.

Similarly, the rightward torque signal from the torque direction sensor 22 and the rightward drive signal from the CPU 3 are applied to the input terminals of two AND gates 55 and 57. The output terminal of AND gate 55 is connected to the gate of MOSFET 40, and the output terminal of AND gate 57 is connected to the second input terminal of AND gate 29 via an inverter 33.

The output terminals of AND gates 29 and 30 are connected to the input terminals of an OR gate 31 whose output terminal is connected to the input terminal of a self-holding circuit 24. The self-holding circuit 24 maintains a high or low level output signal which is supplied to a relay interrupter 25 which operates the failure relay 26.

The failure relay 26 has a fixed contact 41a which is connected to the motor driver 10 and the clutch driver 21 and another fixed contact 41b which is connected to the positive terminal of the battery 36 via the key switch 46. A movable contact 42 can be moved into and out of contact with the fixed contacts by a coil 43 whose current is controlled by the interrupter 25. When current flows through the coil 43, the movable contact 42 is in a closed position. When the supply of current to the coil 43 is cut off, the movable contact 42 moves to an open position and cuts off the current from the battery 36 to both the motor driver 10 and the clutch driver 21.

Figure 2:
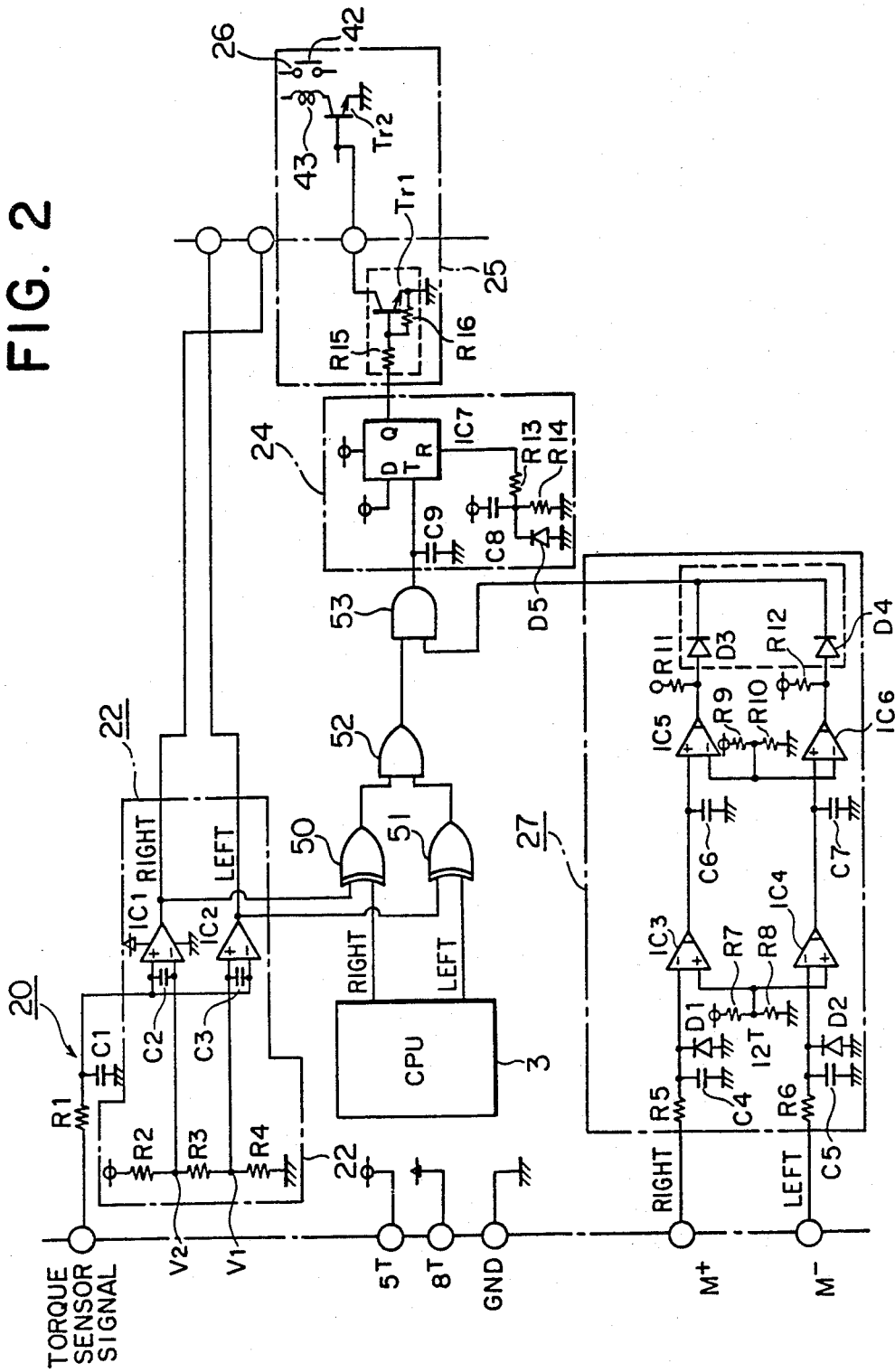
FIG. 2 is a circuit diagram showing the embodiment of FIG. 1 in greater detail.

FIG. 2 is a circuit diagram of a concrete example of the embodiment of FIG. 1. As shown in FIG. 2, the differentiation circuit 20 comprises a resistor R1 which is connected to the output terminal of the torque sensor 1 and a capacitor C1 which is connected between the resistor R1 and ground. The torque direction sensor 22 includes two comparators IC1 and IC2. The two input terminals of each comparator are connected through capacitors C2 and C3, respectively. The positive input terminal of comparator IC1 and the negative input terminal of comparator IC2 are connected to the output terminal of the differentiator 20. The negative input terminal of comparator IC1 is connected to the junction between resistors R2 and R3, and the positive input terminal of comparator IC2 is connected to the junction between resistors R3 and R4. Resistors R2-R4 are connected in series between a voltage supply and ground and are chosen such that reference voltages V2 and V1 (V2>V1) are applied to comparators IC1 and IC2.

Comparator IC1 generates a rightward torque signal which is high when the steering torque is to the right, and IC2 generates a leftward torque signal which is high when the steering torque is to the left. The rightward torque signal and the leftward torque signal are input to the first input terminals of exclusive OR gates 50 and 51, respectively.

The CPU 3 generates a rightward drive signal and a leftward drive signal which are input to the second input terminals of the exclusive OR gates 50 and 51, respectively. The outputs of both exclusive OR gates 50 and 51 are applied to the first and second input terminals of an OR gate 52. The output terminal of OR gate 52 is connected to the first input terminal of an AND gate 53.

The self-holding circuit 24 includes a D-type flip-flop IC7, and the output of AND gate 53 is applied to the T terminal of the flip-flop IC7. The T terminal is grounded through a capacitor C9. The D terminal of the D-type flip-flop IC7 is connected to a power supply, and the R terminal is connected to the junction of a capacitor C8 and a resistor R14 through another resistor R13. A diode D5 is connected to ground in parallel with resistor R14. Capacitor C8 and resistor R14 are connected in series between the power supply and ground.

The interrupter 25 includes two transistors Tr1 and Tr2. The Q terminal of the D-type flip-flop IC7 is connected to the base of transistor Tr1 through a resistor R15 and another resistor R16 is connected between the base and the emitter of transistor Tr1. The collector of transistor Tr1 is connected to the base of transistor Tr2. The emitter of transistor Tr2 is grounded, and its collector is connected to the coil 43 which drives the movable contact 42 of the failure relay 26.

The ground fault sensor 27 includes four comparators IC3–IC6. The positive terminal M+ (into which current flow during a right turn) and the negative terminal M− (into which current flows during a left turn) of the electric motor 14 are connected to the negative input terminals of comparators IC3 and IC4 through resistors R5 and R6, respectively.

The positive input terminals of comparators IC3 and IC4 are connected with one another and to the junction of two resistors R7 and R8. The two resistors R7 and R8 are connected in series between a power supply and ground and are chosen so that the voltage which is applied to the positive input terminals of comparators IC3 and IC4 is a desired reference value, such as 1.2 V.

The negative input terminals of comparators IC3 and IC4 are grounded through capacitors C4 and C5, respectively. The output terminals of comparators IC3 and IC4 are connected to the positive input terminals of comparators IC5 and IC6. The positive input terminals of comparators IC5 and IC6 are grounded through capacitors C6 and C7. The negative input terminals of comparators IC5 and IC6 are connected to one another and to the junction of resistors R9 and R10. Resistors R9 and R10 are connected between a power supply and ground, and are selected so that a desired reference voltage is applied to the negative input terminals of comparators IC5 and IC6.

The output terminals of comparators IC5 and IC6 are connected to a power supply through resistors R11 and R12, respectively and are also connected to the second input terminal of AND gate 53 through diodes D3 and D4.

Next, the operation of the embodiment of FIGS. 1 and 2 will be described. When the driver of the vehicle applies a torque to the steering wheel, the applied torque is detected by the torque sensor 1, which generates a corresponding output voltage. Its output is differentiated by the differentiator 20 and is input to the CPU 3 and the torque direction sensor 22.

The CPU 3 receives the torque signal from the torque sensor 1, and based on the magnitude of the torque signal, it determines both the direction and magnitude of the torque. The CPU 3 then outputs to the motor driver 10 a rightward drive signal or a leftward drive signal which indicates the direction of the torque to be exerted by the motor 14.

As a result, the motor driver 10 drives the motor 14 to the right or to the left so as to generate a torque which is nearly proportional to the torque signal from the torque sensor 1. The motor 14 exerts a torque on the steering shaft through the unillustrated clutch and decreases the steering torque which must be exerted by the driver.

The current passing through the motor 14 flows through the detecting resistor 12 and a voltage corresponding to the current is generated across the ends of the detecting resistor 12. The voltage across the detecting resistor 12 is applied to the motor current sensor 11, and the motor current is thereby detected.

MOSFET's 38 and 40 are gated by the outputs of AND gates 54 and 55, respectively. These AND gates generate a high output signal only when the directional output signal from the torque direction sensor 22 agress with the corresponding directional output signal from the CPU 3. Accordingly, if one of the directional output signals from the torque direction sensor 22 does not match the corresponding directional drive signal from the CPU 3, MOSFET's 38 and 40 are not gated, the motor driver 10 is prevented from operating, and no current is supplied to the motor 14.

If the leftward torque signal of the torque direction sensor 22 does not agree with the leftward drive signal from the CPU 3, AND gate 56 generates a low output and the output of inverter 32 goes high to indicate disagreement of the leftward directional signals. Similarly, if the rightward torque signal of the torque direction sensor 22 does not agree with the rightward drive signal from the CPU 3, AND gate 57 generates a low output and the output of inverter 33 goes high to indicate disagreement of the rightward directional signals.

When a ground fault of the motor driver 10 is detected by the ground fault sensor 27, the ground fault sensor 27 applies a high output signal to AND gate 29 or 30 after a prescribed delay which is produced by timer 34 or 35.

If either of AND gates 29 and 30 goes high, it is determined that there is disagreement of directional signals and a ground fault at the same time, and the output of OR gate 31 goes high. When the output of OR gate 31 goes high, the output of the self-holding circuit 24 goes low, and the interrupter 25 cuts off the current to coil 43 of the failure relay 26. When the coil 43 is deenergized, the movable contact 42 separates from the fixed contacts 41a and 41b, the clutch driver 21 and the motor driver 10 are cut off, and the steering wheel is manually operated.

When the key switch 46 is closed, the movable contact 42 moves to its closed position. As a result, power can be supplied from the battery 36 to the motor driver 10 and the clutch driver 21, the motor 14 is connected to the steering shaft by the unillustrated clutch, and it is possible for the motor 14 to assist steering.

Next, the operation of the circuit shown in FIG. 2 will be explained. The torque signal from the torque sensor 1 is input to the differentiator 20 and the differentiated signal is applied to the positive input terminals of comparators IC1 and IC2 of the torque direction sensor 22.

The comparators IC1 and IC2 compare the output of the differentiator 20 with reference voltages V1 and V2, respectively. If the differentiated signal is greater than or equal to reference voltage V2, the output of comparator IC1 goes high to indicate the steering wheel is being turned to the right. If the differentiated signal is less than or equal to reference voltage V1, the output of comparator IC2 goes high to indicate that the steering wheel is being turned to the left.

When the level of the output signal of comparator IC1 does not agree with the level of the rightward drive signal of the CPU 3, the output of exclusive OR gate 50 goes high to indicate disagreement. Similarly, when the level of the output signal of comparator IC2 does not agree with the level of the leftward drive signal of the CPU 3, the output of exclusive OR gate 51 goes high to indicate disagreement. When either of gates 50 and 51 goes high, the output of OR gate 52 also goes high.

The comparators IC3 and IC4 of the ground fault sensor 27 compare the motor positive terminal voltage and the motor negative terminal voltage, respectively, with a reference voltage, such as 1.2 V, which is determined by resistors R7 and R8.

In a state in which steering to the right is prohibitted due to disagreement of the rightward torque signal of the torque direction sensor 22 and the rightward drive signal of the CPU 3, if the input to the negative terminal of comparator IC3 is less than or equal to the reference voltage of about 1.2 V, it is determined that power MOSFET 38 of the motor driver 10 is shorted, and the output of comparator IC3 goes high. This high output is applied to the positive input terminal of comparator IC5. As capacitor C6 is connected to the positive input terminal of comparator IC5, the positive input terminal of comparator IC5 can go from a low to a high level only after a prescribed delay (approximately 0.5 seconds).

When the input voltage to the positive input terminal of comparator IC5 exceeds a reference voltage which is determined by resistors R9 and R10, the output of comparator IC5 goes high, and through diode D3, this output is input to AND gate 53.

Similarly, in a state in which steering to the left is prohibitted due to disagreement of the leftward torque signal of the torque direction sensor 22 and the leftward drive signal of the CPU 3, if the input to the negative input terminal of comparator IC4 is less than or equal to the reference voltage of approximately 1.2 V, it is determined that power MOSFET 40 of the motor driver 10 is shorted, and the output of comparator IC4 goes high. The output of comparator IC4 is input to comparator IC6. The positive terminal of comparator IC6 reaches a high level after a prescribed delay which is produced by capacitor C7, and the output of comparator IC7 then goes high. Via diode D4, the output of comparator IC6 is input to AND gate 53.

When the T terminal (the clock input terminal) is changed from a low to a high level, a low level appears at the Q terminal and due to this low output, transistor Tr1 of the interrupter 25 is turned off, transistor Tr2 is driven, the movable contact 42 of the failure relay 26 is moved to an open position, the motor driver 10 and the clutch driver 21 are disconnected from the battery 36, and the output shaft of the motor 14 is disconnected from the steering shaft. As a result, the motor 14 can not assist steering, and steering must be performed manually.

Thus, in accordance with the embodiment of FIGS. 1 and 2, whenever there is disagreement between the direction of rotation of the steering wheel by the driver and the directional drive signals from the CPU 3 and there is a ground fault in the motor driver 10, the failure relay 26 automatically disconnects the supply of power to the motor 14 and restores the steering wheel to manual operation, thereby guaranteeing safe operation.

Figure 3:
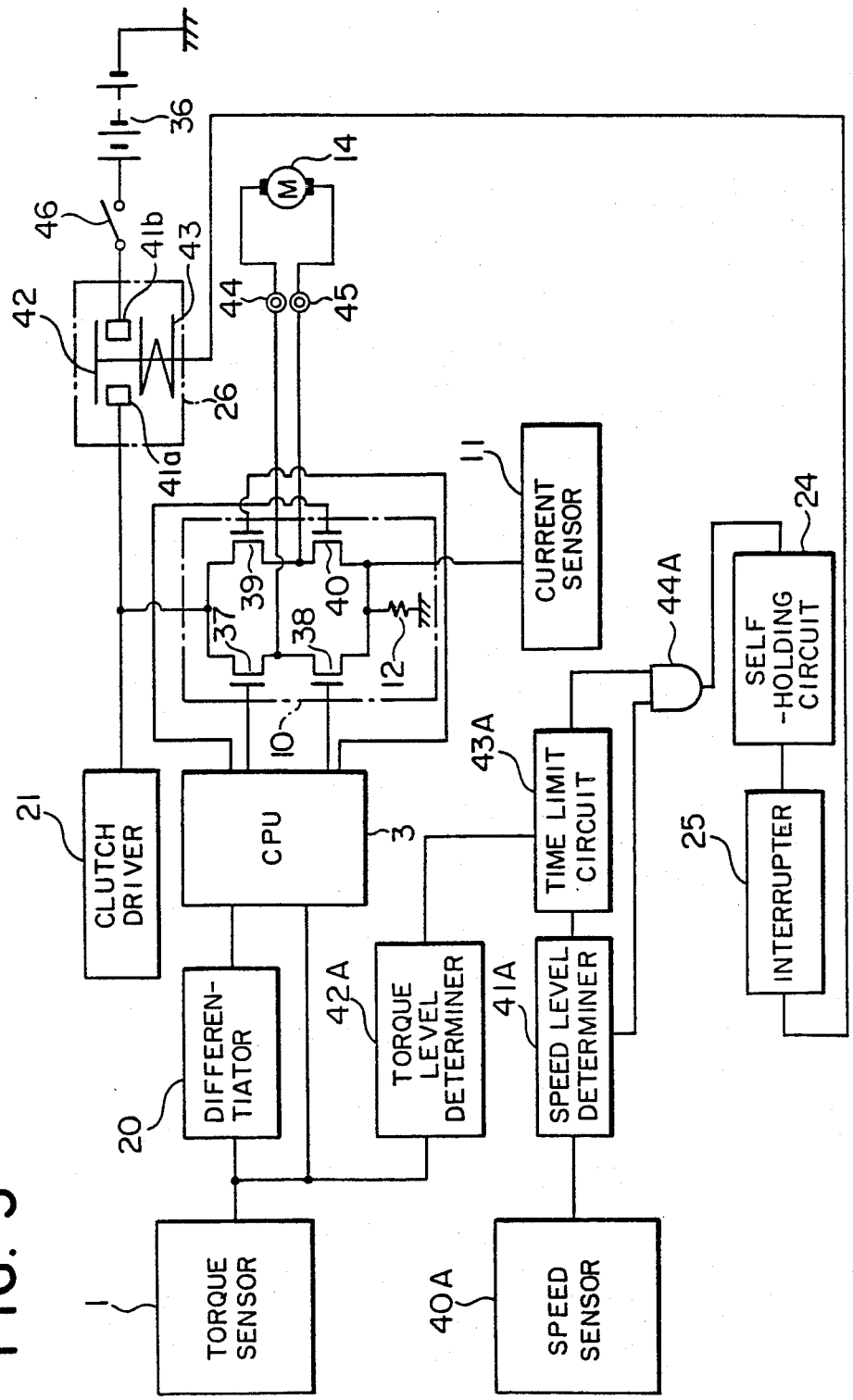
FIG. 3 is a block diagram of a second embodiment of the present invention.

FIG. 3 is a block diagram of a second embodiment of the present invention in which a failure relay 26 is controlled in accordance with the vehicle speed and the level of torque applied to the steering wheel. In FIG. 3, the same elements as in FIG. 1 are affixed with the same symbols so an explanation of those elements common to the first embodiment will be omitted.

In the embodiment of FIG. 3, the ground fault sensor 27, timers 34 and 35, AND gates 29 and 30, inverters 32 and 33, and OR gate 31 of FIG. 1 have been deleted. In their place, a vehicle speed sensor 40A has been provided. The vehicle speed sensor 40A generates an output signal corresponding to the vehicle speed, and this signal is input to a vehicle speed level determiner 41A which determines whether the vehicle speed is within certain speed ranges and generates corresponding output signals. In addition, the torque direction sensor 22 of FIG. 1 has been replaced by a torque level determiner 42A which generates an output signal corresponding to the magnitude of the signal from the torque sensor 1.

The output signal of the torque sensor 1 is input to this torque level determiner 42A, and the output signal of the torque level determiner 42A is input to a time limit circuit 43A.

The output of the vehicle speed level determiner 41A and the output of the time limit circuit 43A are input to an AND gate 44A. The output of the AND gate 44A is input to the self-holding circuit 24. The structure of this embodiment is otherwise the same as that of the embodiment of FIG. 1.

Figure 4:
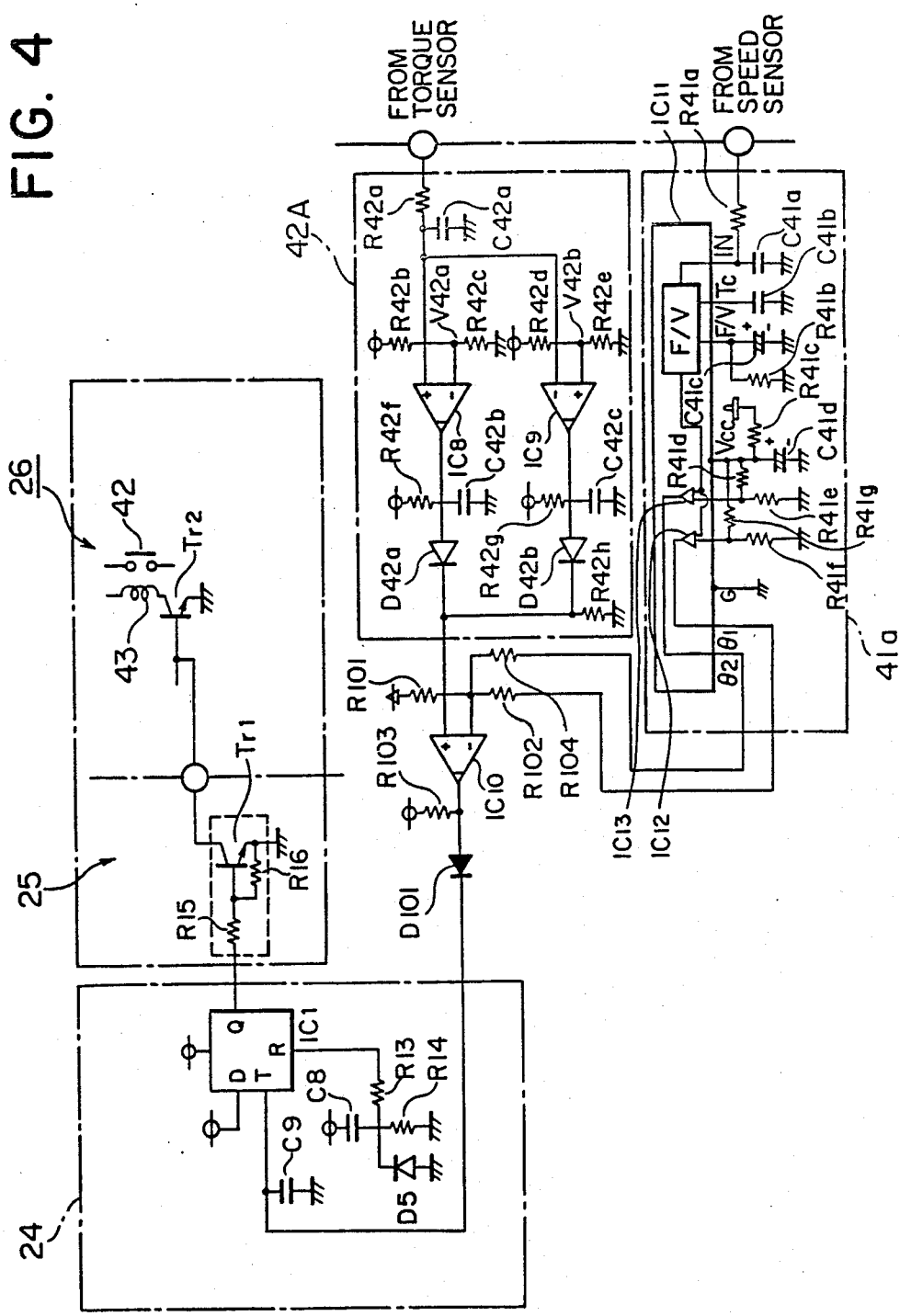
FIG. 4 is a circuit diagram showing the embodiment of FIG. 3 in greater detail.

FIG. 4 is a circuit diagram showing the structure of a concrete example of the self-holding circuit 24, the interrupter 25, the vehicle speed level determiner 41A, and the torque level determiner 42A of FIG. 3. The self-holding circuit 24 and the interrupter 25 are the same as those shown in FIG. 2, so an explanation thereof will be omitted.

The torque level determiner 42A includes two comparators IC8 and IC9. The output signal from the torque sensor 1 is input to the positive input terminal of comparator IC8 and the negative input terminal of IC9 through a resistor R42a. The positive input terminal and the negative input terminal of comparators IC8 and IC9 are grounded through a capacitor C42a.

The negative input terminal of comparator IC8 is connected to the junction between resistors R42b and R42c, and the voltage V42a at this junction is applied to the negative input terminal as a reference voltage. Resistors R42b and R42c are connected in series between a power supply and ground.

Similarly, the positive input terminal of comparator IC9 is connected to the junction of resistors R42d and R42e and a reference voltage V42b is applied thereto. Resistors R42d and R42e are connected in series between a power supply and ground.

The output terminal of comparator IC8 is connected to a power supply through a resistor R42f and is connected to ground through a capacitor C42b. Similarly, the output terminal of comparator IC9 is connected to a power supply through a resistor R42g and to ground through a capacitor C42c.

The output terminal of comparator IC8 and the output terminal of comparator IC9 are connected to the positive input terminal of another comparator IC10 through diodes D42a and D42b, respectively, and are connected to ground through a resistor R42h.

The negative input terminal of comparator IC10 is connected to the junction of resistor R101 with resistors R102 and R104. The output terminal of comparator IC10 is connected to a power supply through a resistor R103 and is connected to the T terminal of the D-type flip-flop IC7 of the self-holding circuit 24 through a diode D101.

The vehicle speed level determiner 41A comprises an integrated circuit IC11 which includes a frequency/voltage converter F/V and two comparators IC12 and IC13. The output signal of the speed sensor 40A is input to the input terminal of the frequency/voltage converter F/V through a resistor R41a. In the vehicle speed level determiner, R41b–R41g are resistors and C41a–C41d are capacitors. Comparator IC12 has an output terminal $\theta1$ which is connected to ground through resistors R102 and R101, and comparator IC13 has an output terminal $\theta2$ which is connected to the negative input terminal of comparator IC10 through resistor R104.

The output signal of the frquency/voltage converter F/V is applied to the negative input terminals of comparators IC12 and IC13. The positive input terminal of comparator IC12 is connected to the junction of resistors R41f and R41g, and the positive input terminal of comparator IC13 is connected to the junction of resistors R41d and R41e.

During the operation of the embodiment of FIG. 3, the output of the vehicle speed sensor 40A is input to the vehicle speed level determiner 41A, and the speed level determiner 41A generates an output signal corresponding to the speed range of the vehicle as indicated by the signal from the vehicle speed sensor 40A. When the vehicle speed exceeds a certain value, the speed level determiner 41A outputs a high level to AND gate 44A.

The torque level determiner 42A generates an output signal corresponding to the range of the torque applied to the steering wheel as indicated by the output signal from the torque sensor 1. When the torque level exceeds a prescribed value for a prescribed length of time, as determined by the time limit circuit 43A, the output of the time limit circuit 43A goes high and is input to the AND gate 44A. When the output of the AND gate 44A goes high, the output of the self-holding circuit 24 goes low, causing the interrupter 25 to deenergize the coil 43 of the failure relay 26 and cut off the supply of power to the motor driver 10 and the clutch driver 21. The operation of this embodiment is otherwise the same as that of the embodiment of FIG. 1.

Next, the operation of the circuit of FIG. 4 will be explained. The output signal of the vehicle speed sensor 40A is input to the frequency/voltage converter F/V of the vehicle speed level determiner 41A and an analog signal having a voltage corresponding to the vehicle speed is generated and input to comparators IC12 and IC13. This voltage is compared with the reference voltages which are input to the positive input terminals of the two comparators IC12 and IC13. Each comparator generates a low output voltage if the input voltage from the frequency/voltage converter F/V exceeds the corresponding reference voltage.

The torque signal from the torque sensor 1 is input to the positive input terminal of comparator IC8 and the negative input terminal of comparator IC9 of the torque level determiner 42A, and the comparators IC8 and IC9 determine the level of steering torque to the right or left. The level of leftward steering torque is determined by the level of comparator IC8. When the input voltage to its positive terminal is smaller than reference voltage V42a which is determined by the values of resistors R42b and R42c, the output of comparator IC8 changes from a high to a low level.

The level of rightward steering torque is determined by comparator IC9. When the input voltage to its negative input terminal is larger than reference voltage V42b which is determined by the values of resistors R42d and R42e, the output of comparator IC9 changes from a high to a low level.

When the vehicle speed v is within a range $v2 > v > v1$, the output of output terminal $\theta1$ of comparator IC12 of the vehicle speed level determiner 41A goes low, and a reference voltage E1 having a magnitude which is determined by the values of resistors R1O1 and R1O2 is applied to the negative input terminal of comparator IC1O.

If either the leftward or rightward steering torque exceeds a set level which is determined by reference voltages V42a and V42b, the output of comparator IC8 or IC9, respectively, goes low. Therefore, the output signal of comparator IC10 also goes low.

The output signal of comparator IC10 is input to the T terminal of the D-type flip-flop of the self-holding circuit 24, so when the output signal of comparator IC10 goes low, the output signal from the Q terminal of the flip-flop IC7 goes low. Therefore, transistor Tr1 of the interrupter 25 is turned on, transistor Tr2 is turned off, and the movable contact 42 of the failure relay 26 moves to an open position. As a result, the supply of power to the motor driver 10 and the clutch driver 21 is cut off, and steering is performed manually.

Capacitors C42b and C42c on the output sides of comparators IC8 and IC9 form the time limit circuit 42A. In order for the input signal to the positive input terminal of comparator IC10 to go low, it is necessary for the output signals of comparators IC8 or IC9 to remain at low level for the discharge times of comparators C42b or C42c, respectively. This means that steering torque of at least a prescribed level must be applied for at least a prescribed length of time in order for the interrupter 25 to be activated.

If the vehicle speed v is in the range $v3 > v > v2$, comparator IC13 operates instead of comparator IC12, and a low signal is output from output terminal $\theta2$ instead of from output terminal $\theta1$. When the level of output terminal $\theta2$ goes low, a reference voltage E2 appears at the negative input terminal of comparator IC10. Resistor R104 is chosen such that reference voltage E2 is greater than reference voltage E1. Therefore, the delay time between when the output of comparator IC8 or IC9 goes low and when comparator IC10 goes low is shorter than in the lower speed range described above. Accordingly, the failure relay 26 is opened after the steering torque has exceeded a prescribed level for a shorter length of time.

Examples of conditions under which the failure relay 26 is opened are as follows.

(i) When the vehicle speed v is $20 \text{ km/hr} > v > 10 \text{ km/hr}$ and the steering torque (leftward or rightward) $\geq 290$ kg.cm for at least approximately 0.4–0.6 seconds.

(ii) When the vehicle speed v is $45 \text{ km/hr} > v > 20 \text{ km/hr}$ and the steering torque (leftward or rightward) $\geq 90$ kg.cm for at least approximately 0.1–0.3 seconds.

Thus, in accordance with this embodiment, at vehicle speeds at which power steering can be dangerous, if the driver applies a high torque to the steering wheel for at least a prescribed length of time, the motor 14 is automatically disconnected from the steering shaft and the steering wheel is restored to manual operation. The safety of the steering system at higher speeds is therefore increased.

Figure 5:
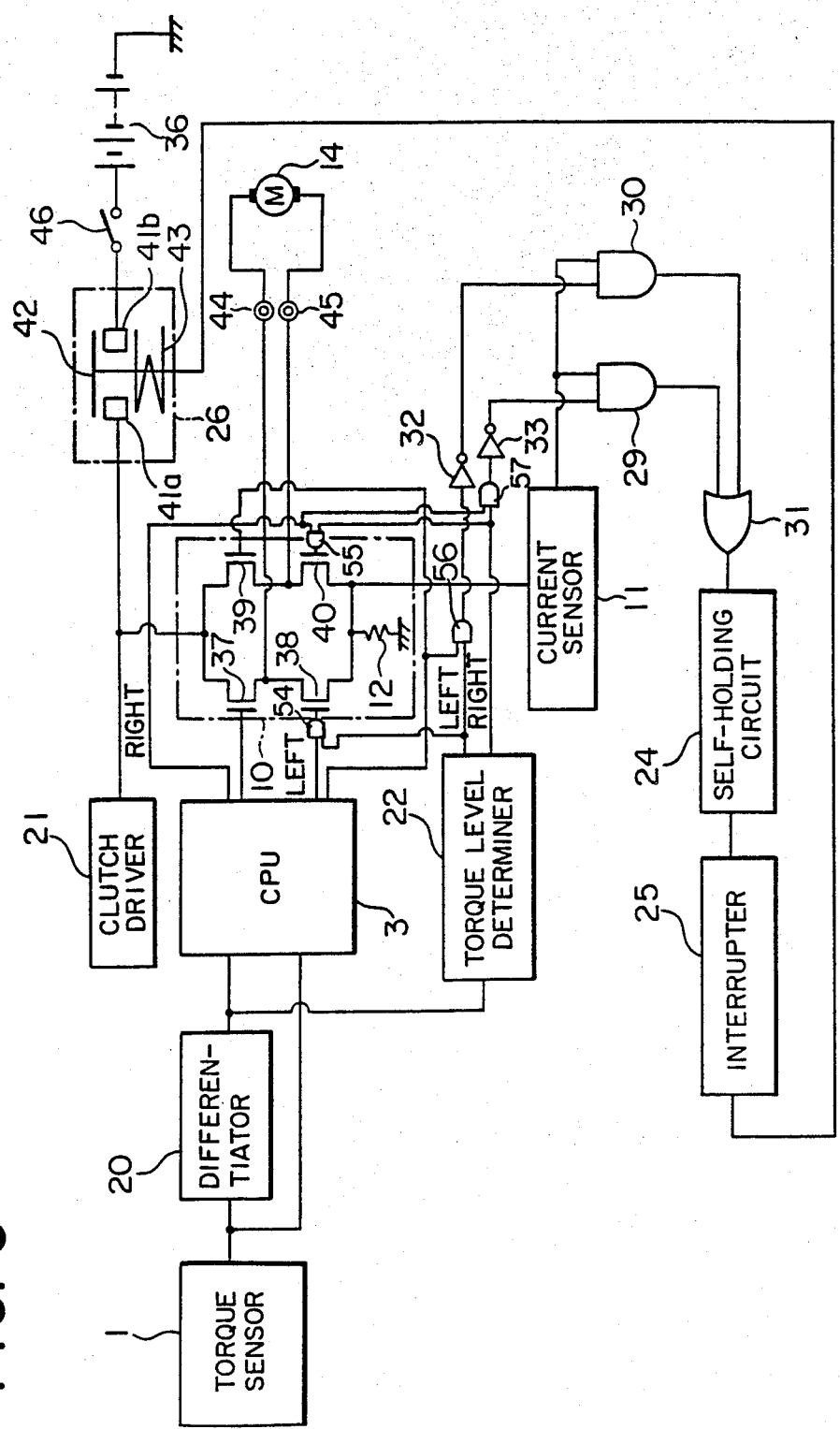
FIG. 5 is a block diagram of a third embodiment of the present invention.

FIG. 5 is a block diagram of a third embodiment of the present invention in which the operation of the failure relay 26 is controlled such that power steering is prevented when there is disagreement of the directional signals and the motor current exceeds a prescribed level. In this embodiment, the ground fault sensor 27 and the timers 34 and 35 of FIG. 1 have been deleted, and the output of the motor current sensor 11 is applied to the second input terminals of AND gates 29 and 30. The structure is otherwise the same as that of the embodiment of FIG. 1.

Figure 6:
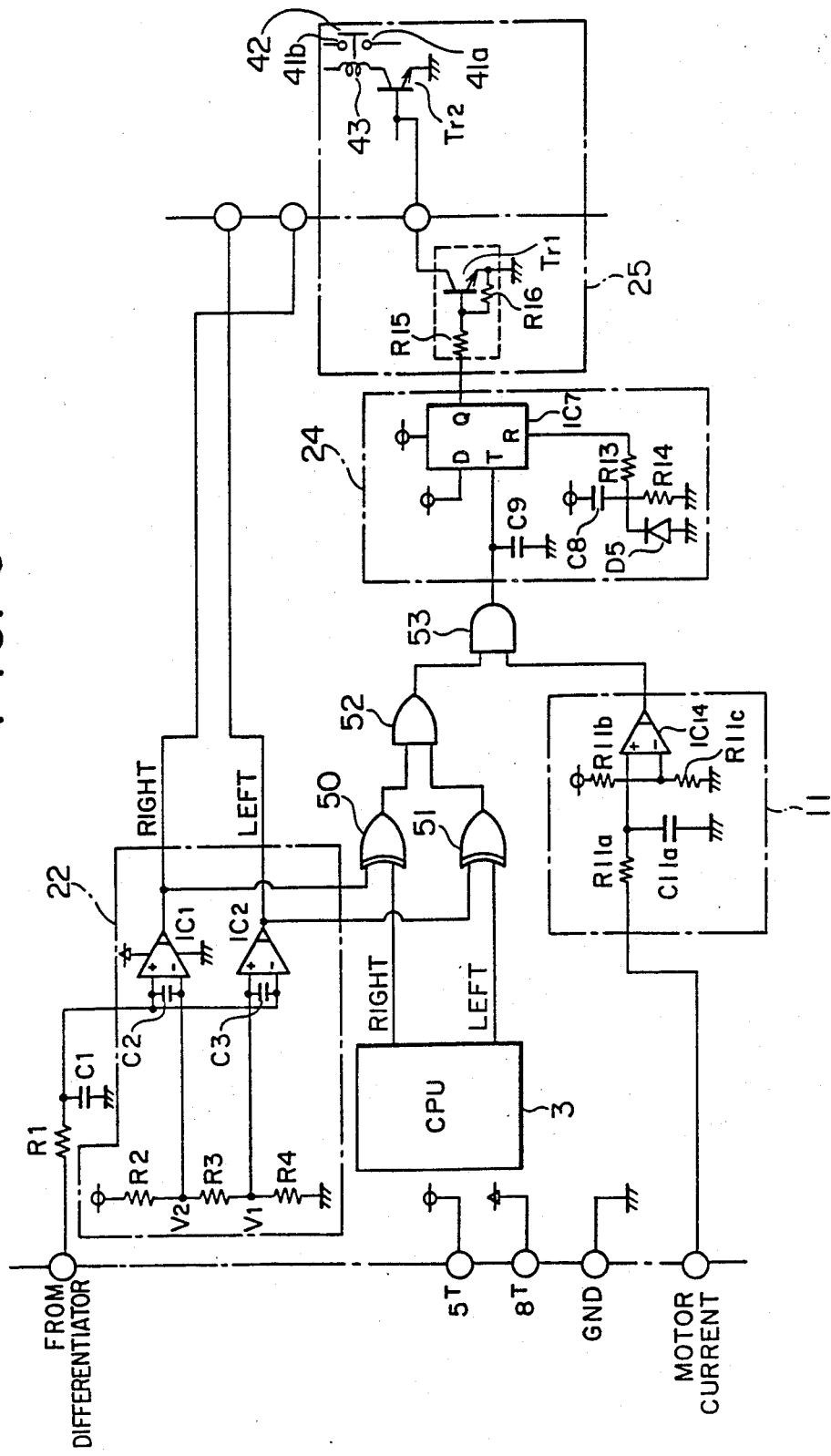
FIG. 6 is a circuit diagram showing the embodiment of FIG. 5 in greater detail.

FIG. 6 is a circuit diagram showing the structure of the embodiment of FIG. 5 more concretely. As shown in this figure, the motor current sensor 11 has a comparator IC14 to whose positive input terminal is applied the voltage across the current detecting resistor 12 via a resistor R11a. The positive input terminal is grounded through a capacitor C11a. The negative input terminal of comparator IC14 is connected to the junction of resistors R11b and R11c. These resistors are connected in series between a power supply and ground, and a reference voltage which is determined by the magnitudes of resistors R11b and R11c is applied to the negative input terminal of comparator IC14.

The output terminal of comparator IC12 is connected to one of the input terminals of AND gate 53. The structure is otherwise the same as that shown in FIG. 2.

Next, the operation of this third embodiment will be explained. As in the embodiment of FIG. 1, inverter 32 generates a high output when there is disagreement between the leftward torque signal from the torque direction sensor 22 and the leftward drive signal from the CPU 3, while inverter 33 generates a high output when there is disagreement between the rightward torque signal from the torque direction sensor 22 and the rightward drive signal from the CPU 3. When the motor current exceeds a prescribed level, the motor current sensor 11 provides a high output to AND gates 29 and 30. Therefore, when there is disagreement between left or right directional signals and the motor current exceeds the prescribed level, one or both of AND gates 29 and 30 will go high, the output of OR gate 31 will go high, and the supply of current to the motor driver 10 and the clutch driver 21 will be cut off by the self-holding circuit, the interrupter 25, and the failure relay 26 as in the previous embodiments.

Next, the operation of the circuit shown in FIG. 6 will be explained. As in circuit of FIG. 2, the series of logic gates 50-52 generate a high output when the rightward torque signal from comparator IC1 does not agree with the rightward drive signal of the CPU 3 or the leftward torque signal from comparator IC2 does not agree with the leftward drive signal from the CPU 3.

A voltage which is proportional to the motor current is applied to the positive terminal of comparator IC14. This voltage is compared with a reference voltage determined by the values of resistors R11b and R11c, and if this reference voltage is exceeded, comparator IC14 generates a high output voltage.

When the outputs of OR gate 52 and comparator IC14 both go high, the output of AND gate 53 goes high, the level of the T input terminal of the flip-flop IC7 goes high, the level of its Q terminal goes low, transistor Tr1 of the interrupter 25 is turned off, transistor Tr2 is turned on, the movable contact 42 of the failure relay 26 is moved to an open position, and the supply of current to the motor driver 10 and the clutch driver 21 is cut off so that the steering wheel must be operated manually.

Thus, in accordance with this third embodiment, when there is disagreement of the directional signals and the motor current exceeds a prescribed level, the motor 14 is prevented from exerting a steering torque on the steering shaft and safe operation of the vehicle is guaranteed.

In the above-described embodiments, the electric motor 14 applies a torque to the steering shaft of the vehicle in order to assist the driver. However, as long as the motor 14 can decrease the torque which need be exerted by the driver, it can be connected to any other suitable part of the steering gear, such as to a steering rack, with the same effects.

What is claimed is:

1. An electric power steering apparatus for a vehicle comprising:
   an electric motor which can be connected to a steering gear of a vehicle so as to steer the vehicle;
   a steering torque sensor for sensing a steering torque applied to a steering shaft by a driver of the vehicle and generating a corresponding output signal;
   control means for determining a proper rotational direction of said motor based on the output signal of said torque sensor and generating a drive direction signal indicating the direction in which said motor should rotate;
   a motor driver which is responsive to said control means and drives said motor in the direction indicated by the drive direction signal;
   a torque level determiner which determines when the level of the steering torque applied by the driver of the vehicle exceeds a prescribed torque based on the output signal of said steering torque sensor;
   a vehicle speed level determiner which determines when the speed of the vehicle exceeds a prescribed speed;
   time limit means for establishing a time limit; and
   interrupter means responsive to said torque level determiner, said vehicle speed level determiner, and said time limit means for preventing current from being supplied to said motor driver when the speed of the vehicle exceeds the prescribed speed and the torque applied by the driver exceeds the prescribed torque for at least the time limit.

2. A power steering apparatus as claimed in claim 1, wherein said time limit means comprises means for establishing a time limit which decreases as the speed of the vehicle increases.

3. An electric power steering apparatus for a vehicle comprising:
   an electric motor which can be connected to a steering gear of a vehicle so as to steer the vehicle;
   a steering torque sensor for sensing a steering torque applied to a steering shaft by a driver of the vehicle and generating a corresponding output signal;
   control means for determining a proper rotational direction of said motor based on the output signal of said torque sensor and generating a drive direction signal indicating the direction in which said motor should rotate;

a torque direction sensor which senses the direction of the steering torque applied to the steering shaft by the driver based on the output signal of said steering torque sensor and generates a torque direction signal indicating the direction of the applied torque;

a motor driver which is responsive to said control means and drives said motor in the direction indicated by the drive direction signal;

a motor current sensor which senses the current flowing through said motor;

disagreement sensing means for sensing when the direction indicated by the torque direction signal from said torque direction sensor does not agree with the direction indicated by the drive direction signal from said control means; and interrupter means for preventing current from being supplied to said motor driver when the current which is sensed by said motor current sensor exceeds a prescribed current and said disagreement sensing means senses a disagreement of the torque direction signal and the drive direction signal.

* * * * *